Figure 1:
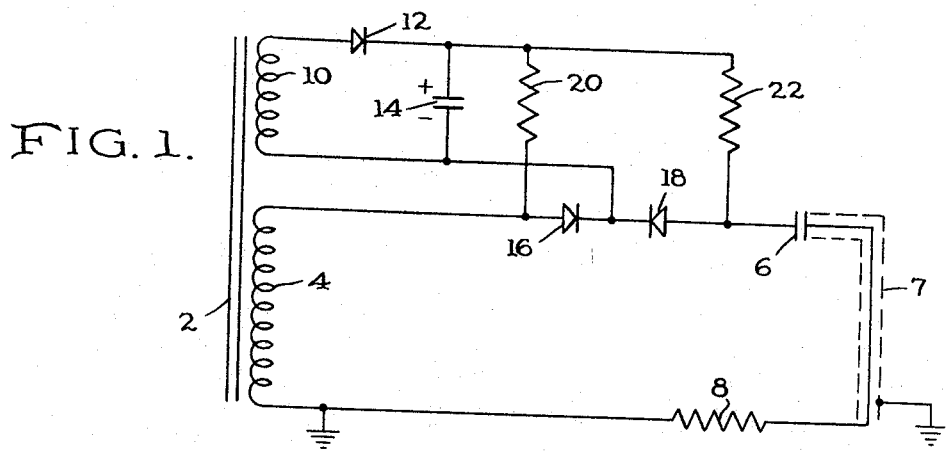

Aug. 8, 1967     I. H. COHN     3,335,359

CURRENT LIMITER CIRCUIT FOR REBALANCING BRIDGE NETWORK

Filed May 11, 1965

INVENTOR

IRVING H. COHN

BY Edwin E. Greigg

ATTORNEY

United States Patent Office 3,335,359
Patented Aug. 8, 1967

3,335,359
CURRENT LIMITER CIRCUIT FOR REBALANCING BRIDGE NETWORK
Irving H. Cohn, New York, N.Y., assignor to Simmonds Precision Products, Inc., Tarrytown, N.Y., a corporation of New York
Filed May 11, 1965, Ser. No. 454,883
4 Claims. (Cl. 323—9)

This invention relates to a current limiting circuit having biased back-to-back diodes and which will perform as a fire hazard current limiter. Specifically, the invention relates to a current limiter circuit having diodes which are biased up into their conducting region and which circuit is connected to a bridge network of a capacity sensing gauging device for fluid in a container.

As known in the art, the continuously rebalancing measuring bridge network generally employs a capacitor measuring device arranged with its capacitor electrodes vertically in a fuel tank or some such other liquid container. The level of the liquid between the capacitor electrodes depends upon the liquid level in the container. The capacitor is designed so that its capacitance is a function of the dielectric constant of the material between its spaced electrodes and also the height of the liquid level. Accordingly, its capacitance will change with a change of liquid level. The bridge network is adapted to compare a reference signal with the measuring signal furnished by the measuring capacitor wherein a resultant signal proportional to the difference of the two is amplified and then caused to operate a motor which will restore the bridge to balance. The degree of correction required to restore the bridge to balance is an indication of the capacitance of the transducer and thus a reflection of the quantity of liquid in the container.

In the prior art devices such as series connected resistances and dry disk rectifiers connected in pairs back-to-back, the values of resistance with which these devices can operate efficiently are above those values recommended by military specifications. A series resistor limits a short circuit current to about 400 milliamperes and increasing the series resistor from its normal value from about 470 ohms results in closing quadrature currents and insensitivity to the associated gauging device. The dry disk rectifier arrangement has not been found to be feasible because the back resistance of such diodes as copper oxide or selenium exhibit a decreasing characteristic with increasing inverse voltage. This prevents the current under short circuit conditions from being limited to a reasonable value. In addition, the back resistance of the diodes is high enough under normal gauging operating conditions to cause bad quadrature effects when large amounts of shunt capacitance are applied from a low impedance point to ground. Further, these devices exhibit very poor high temperature characteristics.

Accordingly, it is the object of this invention to provide a current limiting device which presents a low resistance with capacitance sensing unit currents of ten microamperes under normal gauging operations but which will limit currents above a certain level.

It is another object of this invention to provide a current limiting circuit adapted for use in a capacitance sensing gauging system having a bridge network and in which the current is limited to 20 milliamperes or less with no adverse effect on the gauging operation.

According to one embodiment utilizing the principles of this invention there is provided a diode circuit in which a pair of diodes with a PIV of at least the peak of the applied low impedance voltage are connected back to back. The supply voltage is selected slightly greater than the PIV of the diodes. Two resistances are provided to establish a forward current in each of the diodes of approximately ½ the value to which fire hazard current is to be limited. Normal gauging system currents will add to and subtract from this forward current as the alternating bridge voltage varies. Biasing the diodes at a few milliamperes forward current in effect presents the diodes as a small resistance of a few ohms to normal gauging system currents. If, however, a short occurs from a low impedance point to ground or from a low impedance to a high impedance the diodes will be alternately forced into a reverse direction and will therefore limit the current.

Figure 2:
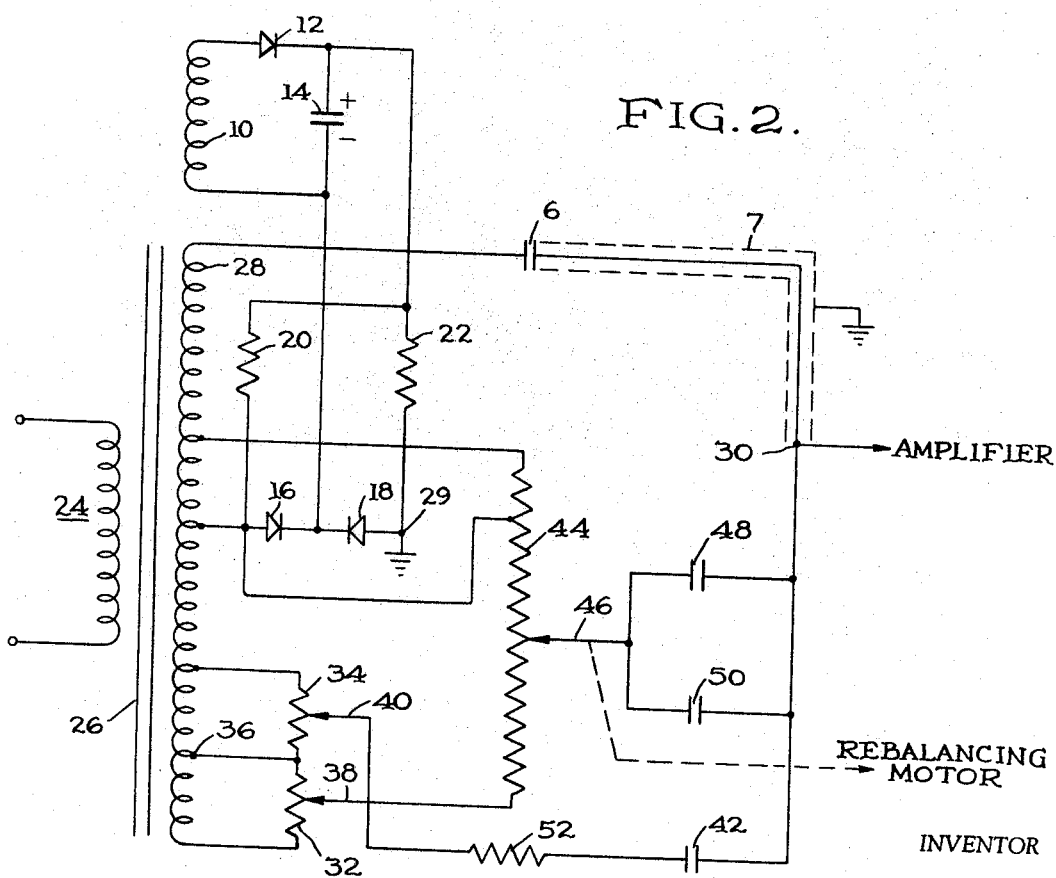

A better understanding of the invention will be had by reading the following detailed description with reference to the appended drawings in which:

FIGURE 1 is a schematic circuit diagram illustrating the current limiting circuit according to this invention connected to the low impedance leg of a capacitance sensing unit in a bridge circuit for a fluid gauging system; and, FIGURE 2 is a schematic circuit diagram illustrating the current limiting circuit according to this invention connected to a compensated bridge network for a fluid gauging system.

Referring now to FIGURE 1, a transformer 2 (only the upper half of which is shown) supplies an alternating voltage to the upper leg of a conventional bridge circuit. The secondary winding core of transformer 2 is connected to the capacitance sensing unit 6 and is grounded at its center tap. The necessary reference signal for comparison with the signal provided by the capacitance sensing unit 6 is derived from a suitable amplifier input impedance normally associated with the bridge circuit and for the sake of simplicity designated by the resistance 8. Connected in series with the low impedance side of the capacitance sensing unit 6 is the current limiting circuit according to this invention. An additional high voltage wire winding 10 is taken off the bridge transformer 2 to supply a voltage E. Since the current flowing in this winding is only a few milliamperes it can be wound with a very fine wire. A diode 12 is connected to the upper leg of the winding 10 and capacitor 14 is connected across the winding to provide a half wave rectifier and filter circuit. Silicon diodes 16 and 18 are connected back-to-back as shown with a PIV of at least the peak of the applied low impedance voltage ($1.41 \times E_{rms}$). The voltage E is selected slightly greater than the PIV and resistors 20 and 22 are connected to the low impedance leg of the bridge as shown to establish a forward current in the diodes 16 and 18 of approximately ½ of the value to which fire hazard current is to be limited. Normal capacitance sensing unit currents will add to and subtract from this forward current as the alternating bridge voltage varies. Biasing the diodes 16 and 18 at a few milliamperes forward current in this manner will cause them to be manifested as a small resistance of a few ohms to the normal capacitance sensing unit currents. If, then, a short occurs either from low impedance to ground or from low impedance to high impedance the diodes 16 and 18 will be alternately forced into reverse direction and will therefore limit the current.

In practice, shunt capacitances as high as 3000μμfd. applied from low impedance to ground will not cause a noticeable effect upon the capacitance sensing unit and the diodes 16 and 18 will merely present themselves as a series impedance of 60 ohms. With a short from low impedance to ground a maximum of 2.3 milliamperes of current will flow and drive the appropriate indicator (not shown) to zero. A short across the capacitance sensing unit 6 will cause the same maximum current to flow.

In FIGURE 2 a compensated bridge network for a fluid gauging system is shown where it will be also necessary to limit the current in the compensator leads to low values. Instead of limiting current in the low impedance leg of the tank unit, as above described, the limiting function is applied to the bridge transformer ground return. This has the effect of placing a 60 ohm impedance in series with the ground return and, again, has no noticeable effect on the normal fluid gauge operation. The bridge network shown in FIGURE 2 is of conventional design and is adapted to be used with the capacitance sensing unit 6. An alternating voltage of suitable frequency, for example, 400 cycles is supplied by source 24 to the transformer 26. Secondary winding 28 of transformer 26 is grounded at its center tap 29. One side of the secondary winding 28 is connected to the capacitance sensing tank unit 6 which, in turn, is connected by a shielded line 7 to an input terminal junction 30 of a current sensing amplifier (not shown). A potentiometer 32 is connected across the lower portion of the other side of secondary winding 28. A second potentiometer 34 is connected across the mid-portion of the lower side of the secondary winding 28 wherein adjacent ends of potentiometers 32 and 34 are conductively connected to a secondary tap 36. Potentiometers 32 and 34 have movable slide arms 38 and 40, respectively, wherein arm 40 is connected to one side of an empty reference capacitor 42, the other side of which is connected to the input terminal junction 30. A potentiometer 44 is connected directly from the secondary 28 to arm 38 as well as to the grounded center tap 29. Potentiometer 44 has a movable slide arm 46 connected to one side of an impedance comprising compensating capacitor 48 and full reference capacitor 50 and the other side of which is connected to the input terminal junction 30. The arm 46 is mechanically connected to a rebalancing motor which is driven by the current sensing amplifier (not shown). The resulting bridge circuit is one used for measuring and indicating the quantity of dielectric fluid in a container, for example, the quantity of fuel in an aircraft fuel tank as more fully described in Patent No. 3,111,845, granted to Steven Prigozy on Nov. 26, 1963.

Connected to the bridge transformer ground return is the limiting current circuit described in FIGURE 1. Diodes 16 and 18 are connected back-to-back (as shown) and are biased by resistors 20 and 22, respectively, as described above. With this arrangement the diodes present themselves as a 60 ohm impedance in series with the ground return and therefore the limiting circuit has no noticeable effect on the normal gauging operation. A short circuit placed either from the capacitance sensing unit's low impedance leg to ground or from the compensator capacitor 48, 50 low impedance leg to ground will cause a maximum of two milliamperes of AC to flow. In the event of such a short circuit at capacitor 48 or 50, high alternating current would attempt to flow through capacitor 48 or 50 into the amplifier; through the amplifier input imperance (not shown) to ground (not shown); then entering from ground at 29 through limiting diodes 18 and 16 through the lower half of transformer winding 28, through the adjustment potentiometer 32 and its arm 38 and the lower portion of potentiometer 44 to its arm 46 and back to capacitor 48 or 50. The alternately forcing diodes 16 and 18, however, will limit this current. In the event of a short circuit in the empty reference capacitor 42 the circuit will be protected by provision of a conventional series resistor 52 having a value of 270 ohms.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

That which is claimed is:

1. A capacitance bridge network comprising a supply transformer having a primary winding and a secondary winding having an intermediate grounded tap, a liquid contents measuring capacitor and a reference impedance connected in series with said secondary winding on one side of said intermediate tap, a rebalancing potentiometer having its input electrically coupled across a portion of said secondary winding on the other side of said intermediate tap and having its adjustable output electrically coupled in series with said reference impedance for controlling the magnitude of voltage applied thereto, a pair of diodes connected back-to-back in series with said measuring capacitance, and means connecting each of said diodes to a resistance for establishing a forward current therein, whereby said diodes present a small resistance of nominal value to said measuring capacitance and upon short-circuiting of said measuring capacitance said diodes will be alternately forced into reverse direction to thereby limit the current flowing through said measuring capacitance.

2. A capacitance sensing bridge network comprising a supply transformer having a primary winding and a secondary winding having an intermediate grounded tap, a liquid contents measuring capacitance and a reference impedance connected in series to said secondary winding on one side of said intermediate tap, a rebalancing potentiometer having its input electrically coupled across a portion of said secondary winding means on the other side of said intermediate tap and having its adjustable output electrically coupled in series with said reference impedance for controlling the magnitude of the voltage applied thereto, diode means connected back-to-back in series with the low impedance side of said measuring capacitance, means connecting said diode means to resistance means for establishing a forward current in said diode means, whereby said diode means presents a small resistance to the normal operation of said bridge network and upon short-circuiting said low impedance side of said measuring capacitance to ground said diodes will be alternately forced into reverse direction to thereby limit the current flow through said bridge circuit.

3. A capacitance sensing bridge network comprising a supply transformer having a primary winding and a secondary winding having an intermediate grounded tap, a liquid contents measuring capacitance and a reference impedance connected in series to said secondary winding on one side of said intermediate tap, a rebalancing potentiometer having its input electrically coupled across a portion of said secondary winding on the other side of said intermediate tap and having its adjustable output electrically coupled in series with said reference impedance for controlling the magnitude of voltage applied thereto, diode means connected back-to-back in series with said intermediate grounded tap, and means connecting said diode means to resistance means for establishing a forward current therein, whereby said diode means present a small resistance of nominal value to said bridge network and upon short-circuiting said bridge network to ground said diode means will be alternately forced into reverse direction to thereby limit the current through said bridge network.

4. A capacitance sensing bridge network comprising a supply transformer having a primary winding and a secondary winding having an intermediate grounded tap, a liquid contents measuring capacitance and a reference impedance connected in series to said secondary winding on one side of said intermediate tap, a rebalancing potentiometer having its input electrically coupled across a portion of said secondary winding means on the other side of said intermediate tap and having its adjustable output electrically coupled in series with said reference impedance to control the magnitude of the voltage applied thereto, diode means connected back-to-back with said intermediate grounded tap, means connecting said diode means to a resistance means for establishing a forward current therein, whereby said diode means will be alternately forced into a reverse direction upon short-circuiting said measuring capacitance and said reference impedance to ground.

References Cited

UNITED STATES PATENTS

| | | | |
|---|---|---|---|
| 2,858,433 | 10/1958 | Rector | 323—9 X |
| 2,942,467 | 6/1960 | Campani | 324—61 X |
| 3,083,572 | 4/1963 | Pearson | 324—61 X |
| 3,098,199 | 7/1963 | Carney et al. | 330—145 X |
| 3,099,789 | 7/1963 | Perrins | 323—9 |

JOHN F. COUCH, *Primary Examiner.*

A. D. PELLINEN, *Assistant Examiner.*